United States Patent
Balmakhtar et al.

(10) Patent No.: US 11,490,450 B1
(45) Date of Patent: Nov. 1, 2022

(54) TRANSLATING VIRTUAL NETWORK FUNCTION

(71) Applicant: T-Mobile Innovations LLC, Overland Park, KS (US)

(72) Inventors: Marouane Balmakhtar, Fairfax, KS (US); Brian Waters, Angel Fire, NM (US)

(73) Assignee: Sprint Communications Company LP, Overland Park, KS (US)

( * ) Notice: Subject to any disclaimer, the term of this patent is extended or adjusted under 35 U.S.C. 154(b) by 7 days.

(21) Appl. No.: 17/246,332

(22) Filed: Apr. 30, 2021

(51) Int. Cl.
*H04W 80/10* (2009.01)
*H04L 69/22* (2022.01)
*H04L 69/327* (2022.01)

(52) U.S. Cl.
CPC ............ *H04W 80/10* (2013.01); *H04L 69/22* (2013.01); *H04L 69/327* (2013.01)

(58) Field of Classification Search
CPC ....... H04W 80/10; H04L 69/22; H04L 69/327
See application file for complete search history.

(56) References Cited

U.S. PATENT DOCUMENTS

| | | | | |
|---|---|---|---|---|
| 2019/0053117 | A1* | 2/2019 | Bae | H04W 76/30 |
| 2020/0059992 | A1* | 2/2020 | Skog | H04L 45/38 |
| 2020/0336321 | A1* | 10/2020 | Ding | H04M 15/852 |
| 2021/0281664 | A1* | 9/2021 | Suryanarayanarao | H04M 15/66 |

* cited by examiner

Primary Examiner — Duc C Ho

(57) ABSTRACT

A method for providing a translating virtual network function by a network element. The method comprises receiving by the network element a first Packet Forwarding Control Protocol (PFCP) message of a plurality of PFCP messages at a first Internet Protocol (IP) address of a plurality of IP addresses of the network element, the first IP address corresponding to a first Session Management Function (SMF) of one or more SMFs, selecting by the network element a translation method based on the first IP address on which the first PFCP message was received, translating by the network element the first PFCP message using the selected translation method into a function-based model representation of the first PFCP message, and configuring by the network element a network interface controller to implement, based on the representation of the first PFCP message, a protocol data unit (PDU) session.

20 Claims, 7 Drawing Sheets

TRANSLATING VIRTUAL NETWORK FUNCTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The 3rd Generation Partnership Project (3GPP) has developed an evolving Fifth Generation (5G) New Radio (5G NR) standard. In a 5G Core network, network management is software-driven and network functions and resources may be virtualized at the edges of the network. The 5G network is more modular than preceding 2G, 3G, and 4G networks, and many different vendors are building network elements for use in 5G networks. These network elements comprise general-purpose or specialized hardware platforms with software or firmware that implement one or more network functions. This has the benefit to network operators that it creates competition between vendors and allows the operator to choose a best technology solution available from a plurality of vendors. However, the evolving nature of 5G standards may result in network elements within a single network that comply with earlier or later releases of the 5G standard. Furthermore, the complexity of the 5G standard can result in differences between different vendors' implementations of the standard. Such differences may arise from the vendors' interpretations of the 5G specifications or from functional additions to the standard, while still remaining in compliance. Further interoperability problems for a network operator may also result from using network elements and functions provided by different vendors.

SUMMARY

In an embodiment, a method for providing a translating virtual network function by a network element is disclosed. The method comprises receiving by the network element a first Packet Forwarding Control Protocol (PFCP) message of a plurality of PFCP messages at a first Internet Protocol (IP) address of a plurality of IP addresses of the network element, the first IP address corresponding to a first Session Management Function (SMF) of one or more SMFs, selecting by the network element a translation method based on the first IP address on which the first PFCP message was received, translating by the network element the first PFCP message using the selected translation method into a function-based model representation of the first PFCP message, and configuring by the network element a network interface controller to implement, based on the representation of the first PFCP message, a protocol data unit (PDU) session.

In another embodiment, a method for providing a plurality of protocol data unit (PDU) sessions by a network element is disclosed. The method comprises establishing by the network element each PDU session of the plurality of PDU sessions based on a function-based model representation of an associated Packet Forwarding Control Protocol (PFCP) message received by the network element, for each packet received by the network element, identifying by the network element the PDU session associated with the packet based on a Packet Detection Rule specified for the PDU session; and when the PDU session is identified for the packet, processing by the network element the packet based on a Buffering Action Rule specified for the PDU session, and forwarding by the network element the packet based on a Forwarding Action Rule specified for the PDU session.

In yet another embodiment, a method for providing a 4G Control and User Plane Separation (4G CUPS) translating virtual network function by a network element is disclosed. The method comprises receiving by the network element a first 4G CUPS control plane message of a plurality of 4G CUPS control plane messages at a first Internet Protocol (IP) address of a plurality of IP addresses of the network element, the first IP address corresponding to a first 4G CUPS control-plane gateway element of one or more 4G CUPS control-plane gateway elements, selecting by the network element a translation method based on the first IP address on which the first 4G CUPS control plane message was received, translating by the network element the first 4G CUPS control plane message using the selected translation method into a function-based model representation of the first 4G CUPS control plane message, and configuring by the network element a network interface controller to implement, based on the representation of the first 4G CUPS control plane message, an Sx session for packet interface between an Evolved Packet Core (EPC) radio access network (RAN) and a packet data network (PDN).

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
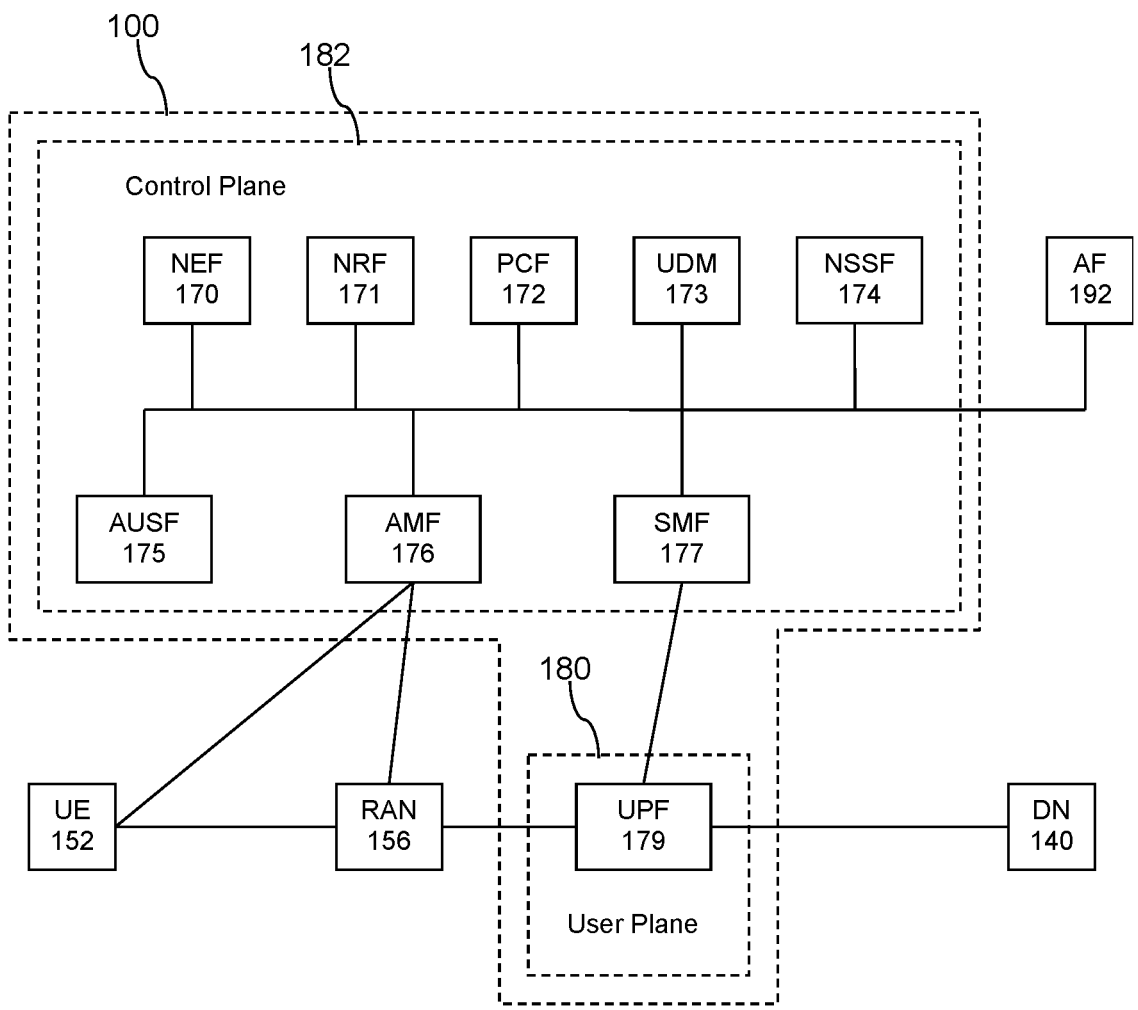
FIG. 1 is a service based architecture block diagram of a 5G core network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

5G communication is provided by interoperations among a plurality of abstract network functions that may execute on generic computer platforms. This new communication paradigm promotes different vendors competing to produce off-the-shelf network function software packages that comply with the 3GPP standards. However, it may arise that network functions produced by different vendors are not wholly interchangeable. The 3GPP standards define many elements, but not all elements of an implementation. The result is that non-trivial integration efforts are involved when interconnecting network functions produced by different vendors. These differences arise both from differences in the release number of the standard being implemented by the network function and from differences in vendor implementations (or enhancements) of those releases. According to embodiments of the disclosure, translator modules operate between the disparate network functions to adapt each different network function to the other. For example, if a session management function (SMF) network function provided by a first vendor interoperates with a user plane function (UPF) network function provided by a second vendor, an appropriately configured translator-as-a-Service (TaaS) adapter is configured between the first vendor's SMF and the second vendor's UPF such that the TaaS adapter adapts communications from the first vendor's SMF into a form compatible with the second vendor's UPF and provides that adapted communication to the second vendor's UPF. The TaaS adapter further adapts communications from the second vendor's UPF into a form compatible with the first vendor's SMF and provides that adapted communication to the first vendor's SMF The TaaS is implemented as a library of such adapters that are configured at runtime to support a specific SMF session being established. This TaaS library of adapters can be built to support many different combinations of vendor implementation and possibly different versions of the 3GPP standards as the standards evolve. The TaaS adapter functionality may be delivered in the form of "plug-ins" deployed in the form of a library. Such TaaS adapter functionality is provided on the N4 interface between the SMF and the UPF. Two distinct categories of adaptation that the TaaS adapter supports are (1) adapting vendor data in the control plane and (2) adapting communication stack content in the user plane. Similar TaaS adapters may also be provided for other interfaces of the 5G core network.

Furthermore, a single UPF presents an interface to multiple SMF session instances as a distinct and independent UPF instance. More specifically, each different SMF session interworks with the same UPF via a different management interface provided by the UPF, as identified by a different IP address for each different management interface. Thus, a single UPF network element supports a plurality of separate management interfaces/IP addresses. This may be characterized as providing multiple "virtual UPFs" as perceived by the different SMF's, using a common hardware accelerator to implement the multiple virtual UPFs. The TaaS adapter configures the accelerator to best match the SMF, because the SMF is the element that is release and (potentially) vendor dependent. Combining this with the insight to tailor the translation of the control plane data (and the resulting translation of the underlying user data) based on the underlying standards release and in some instances with the vendor making the implementation provides important functionality in distinction with alternative approaches.

FIG. 1 is a service-based architecture block diagram of a 5G core network 100 according to an embodiment of the disclosure. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 179, an authentication server function (AUSF) 175, an access and mobility management function (AMF) 176, a session management function (SMF) 177, a network exposure function (NEF) 170, a network repository function (NRF) 171, a policy control function (PCF) 172, a unified data management (UDM) 173, a network slice selection function (NSSF) 174, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 100 may be segregated into a user plane 180 and a control plane 182, thereby promoting independent scalability, evolution, and flexible deployment.

The UPF 179 delivers packet processing and links the UE 152, via the radio access network (RAN) 156, to the packet data network (PDN) 140 illustrated in FIG. 1. The AMF 176 handles registration and connection management of non-access stratum (NAS) signaling with the UE 152. Said in other words, the AMF 176 manages UE registration and mobility issues. The AMF 176 manages reachability of the UEs 152 as well as various security issues. The SMF 177 handles session management issues. Specifically, the SMF 177 creates, updates, and removes (destroys) protocol data unit (PDU) sessions and manages the session context within the UPF 179. The SMF 177 decouples other control plane functions from user plane functions by performing dynamic host configuration protocol (DHCP) functions and IP address management functions. The AUSF 175 facilitates security processes.

The NEF 170 securely exposes the services and capabilities provided by network functions. The NRF 171 supports service registration by network functions and discovery of network functions by other network functions. The PCF 172 supports policy control decisions and flow-based charging control. The UDM 173 manages network user data and can be paired with a user data repository (UDR) that stores user data such as customer profile information, customer authentication number, and encryption keys for the information. An application function 192, which may be located outside of the 5G core network 100, exposes the application layer for interacting with the 5G core network 100. In an embodiment, the application function 192 may execute on an application server located geographically proximate to the UE 152 in an "edge computing" deployment mode. The 5G core network 100 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 174 can help the AMF 176 to select the network slice instance (NSI) for use with the UE 152.

Figure 2:
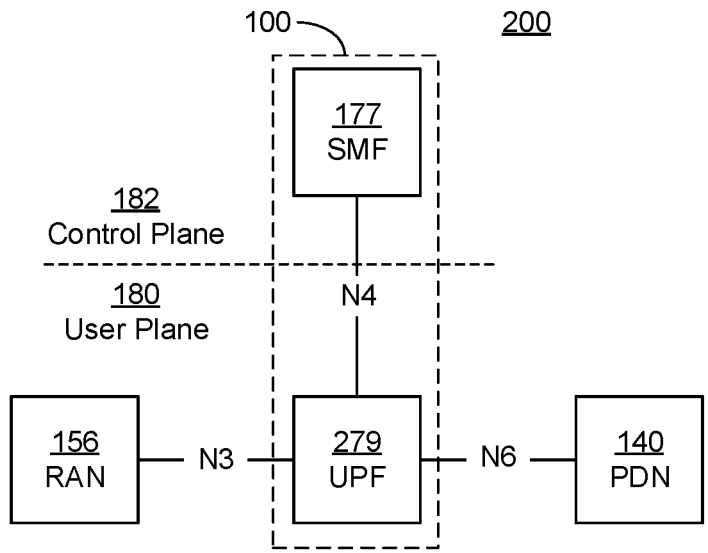
FIG. 2 is a reference point architecture block diagram of a portion of the 5G core network of FIG. 1, including a 5G translating virtual network function according to an embodiment of the disclosure.

FIG. 2 is a reference point architecture block diagram of a portion 200 of the 5G core network 100 of FIG. 1, including a 5G translating virtual UPF 279 according to an embodiment of the disclosure. The reference point architecture represents the 5G core network as a set of Network Elements (NEs) which are implementing network functions and use point to point interfaces (e.g., N3, N4, and N6) to inter-connect among themselves. Signaling procedures are specified by the 5G standard for each point to point interface.

The SMF 177 interconnects with the 5G translating virtual UPF 279 via the N4 interface. The UPF 279 interconnects with the RAN 156 via the N3 interface and with the PDN 140 via the N6 interface. The SMF 177 is part of the control plane 182, and the UPF 279 is part of the user plane 180. The RAN 156 and the PDN 140 are outside the 5G core network 100.

The 5G translating virtual UPF 279 (like other UPFs) operates as a network interface controller. It converts IP packets being sent to/from the PDN 140 into General Packet Radio Service (GPRS) Tunneling Protocol (GTP)-User (GTP-U) packets sent from/to the RAN 156. The SMF 177 sets up such a packet forwarding connection by sending a Packet Forwarding Control Protocol (PFCP) message to the UPF 279 to establish a PDU session. The PFCP message specifies how packets are identified (Packet Detection Rule/PDR), forwarded (Forwarding Action Rules/FARs), processed (Buffering Action Rules/BARs), marked (QoS Enforcement Rules/QERs), and reported (Usage Reporting Rules/URRs).

The 5G translating virtual UPF 279 comprises a so-called Smart-NIC, which allows for additional software to be loaded into the NIC at configuration or during runtime to add new features or support additional functions. The UPF 279 is configured to receive a plurality of PFCP messages from one or more SMFs 177 and to establish a corresponding plurality of PDU sessions between one or more RANs 156 and one or more PDNs 140.

The 5G core network 100 may include SMFs 177 made by different vendors due to incremental addition or replacement of SMFs in the 5G core network 100 or to a network manager's selection of different vendors' SMFs to obtain different SMF features in some parts of the 5G core network 100. While all vendors' SMFs comply with the 3rd Generation Partnership Project (3GPP) standards, several factors contribute to interworking challenges between the 5G translating virtual UPF 279 and SMFs 177 made by different vendors. First, the 3GPP standard is evolving, and a particular model of SMF may comply with an earlier or later release of the standard. Second, even while remaining compliant with the standard, one vendor may interpret a part of the standard in a different way than another vendor. Third, a vendor may add functionality to its SMF by adding or reusing fields and/or information elements (IEs) in PFCP messages that are otherwise standard-compliant.

The 5G translating virtual UPF 279 solves this problem by being configured to connect with SMFs 177 from different vendors at configuration, each connection being part of a different slice, the UPF 279 using a different IP address to communicate with each SMF 177. In this way, a single UPF 279 may appear to a plurality of SMFs 177 as a plurality of virtual UPFs.

Furthermore, the 5G translating virtual UPF 279 is configured to 'understand' the variety of PFCP messages from different vendors and 3GPP releases. The UPF 279 translates the variety of PFCP messages into an internal, function-based PFCP model representation. From that internal model representation, the UPF 279 sets up the Smart-NIC to implement the PDU session specified by each PFCP message between a specified RAN 156 and a specified PDN 140. The translations of the PFCP messages into model representations are performed using a library of translation modules that are stored in the UPF 279 at configuration.

The 5G translating virtual UPF 279 is a virtual network function that translates PFCP messages from SMFs made by different vendors into the internal model to provide a plurality of virtual UPFs to the SMFs. However, it will be understood that in other embodiments, 5G translating virtual network functions according to the disclosure may be used similarly to translate control plane messages received from other network functions that are made by different vendors and/or comply with different 3GPP releases, in order to control a plurality of virtual network functions. Such translating virtual network functions may be understood as core interface controllers that interface between 5G core network elements and devices outside the 5G core network 100. For example, similar functions may be performed by a translating virtual PCF according to the disclosure, which interfaces with AFs outside the core under the control of AMFs or SMFs that are made by different vendors and/or comply with different 3GPP releases. In another example, similar functions may be performed by a translating virtual N3 IWF, which interfaces with Untrusted Non-3GPP devices outside the core under the control of AMFs that are made by different vendors and/or comply with different 3GPP releases.

Figure 3:
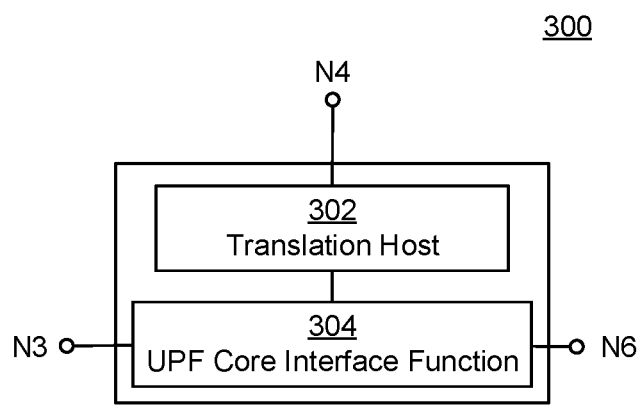
FIG. 3 is a block diagram of a 5G translating virtual network function according to an embodiment of the disclosure.

FIG. 3 is a block diagram of a 5G translating virtual network function 300 according to an embodiment of the disclosure. The network function 300 is implemented on a network element and is suitable for use as the 5G translating virtual UPF 279 shown in FIG. 2. The network function 300 comprises a translation host 302 and a UPF core interface function 304. The translation host 302 communicates with one or more SMFs 177 via the N4 interface. During configuration of the 5G core network 100, the translation host 302 receives one or more configuration messages via the N4 interface, including identifiers of the one or more SMFs 177 with which the translation host 302 will communicate and the individual IP addresses for each SMF 177.

The network function 300 is a virtual network function, and it appears to each SMF 177 as a separate UPF on a unique IP address. In some networks, a single SMF 177 may be configured to use a plurality of UPFs at corresponding plurality of IP addresses, where the single network function 300 provides all the plurality of UPFs as virtual UPFs. Similarly, the single network function 300 may provide a plurality of virtual UPFs to a plurality of SMFs 177, providing one or more virtual UPFs to each SMF 177.

For individual SMFs 177, the configuration message may further include an identifier of a manufacturer of the SMF 177 and the 3GPP release supported by the SMF 177. In some embodiments, the configuration message further includes a translation method to be used by the translation host 302 to translate PFCP messages received from the SMF 177 and reporting messages sent to the SMF 177. In other embodiments, the identifier of the manufacturer of the SMF 177 and the 3GPP release supported by the SMF 177 identifies a translation method preloaded into the translation host 302. The translation host 302 may store received or preloaded translation methods in a library of translation methods, for later access.

When the translation host 302 receives a PFCP message from the SMF 177, the translation host 302 selects a translation method based on the IP address on which the PFCP message was received and translates the PFCP message into an internal, function-based PFCP model representation of the message. The translation method used for an SMF 177 accommodates any unique or different aspects of the implementation of PFCP messages by the manufacturer of the SMF 177 and translates the actual PFCP message into the format of the model's uniform representation of the PFCP message.

The translation host 302 then establishes a PDU session by sending the model representation of the received PFCP message to the UPF core interface function 304. The UPF core interface function 304 configures a protocol data unit (PDU) session based on the model representation of the received PFCP message. Because the 5G translating virtual UPFs 279 and 300 appear as a plurality of virtual UPFs to SMFs 177 of the 5G core network 100, the UPF core interface function 304 is configured to implement a plurality of PDU sessions, each based on the model representation of a different received PFCP message.

PDU usage and event reporting messages relating to a PDU session are received by the translation host 302 from the UPF core interface function 304 in the internal, function-based PFCP model representation. The translation host 302 selects a translation method based on the IP address associated with the PDU session and translates the PDU usage and event reporting message into a PFCP message that accommodates any unique or different aspects of the implementation of PFCP messages by the manufacturer of the SMF 177.

In one embodiment, a processor of the UPF core interface function 304 comprises a field-programmable gate array (FPGA). Via the N3 interface, the FPGA sends and receives General Packet Radio Service (GPRS) Tunneling Protocol (GTP) user packets (GTP-U packets. Via the N6 interface, the FPGA sends and receives IP packets. The FPGA applies Packet Detection Rules (PDRs) from the plurality of PDU sessions to determine whether a received GTP-U or IP packet is associated with one of the PDU sessions. If the packet is not associated with a PDU session, the FPGA discards or otherwise disregards the packet. However, if the packet is associated with a PDU session, the FPGA performs any further processing on the packet that is specified in the PDR. The FPGA then forwards the processed packet as specified in a Forwarding Action Rule of the PDU session.

Typically, packets are received via one of the N3 and N6 interfaces and forwarded via the other interface. Because the UPF core interface function 304 implements a plurality of PDU sessions, packets of a first PDU session will be received intermixed with packets of a second PDU session, and similarly for the forwarding of packets.

In other embodiments, the UPF core interface function 304 may comprise a graphics processing unit (GPU) or other processing accelerator. In still other embodiments, the UPF core interface function 304 may be implemented as a user-level application on the translation host 302.

Figure 4:
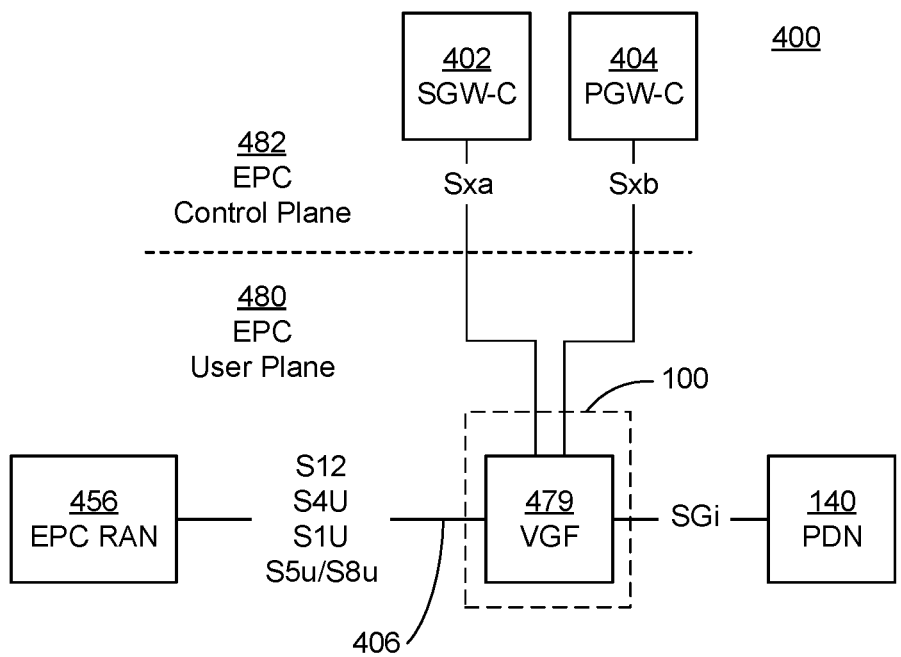
FIG. 4 is a reference point architecture block diagram of a portion of the 5G core network of FIG. 1, including an 4G CUPS translating virtual gateway function according to an embodiment of the disclosure.

FIG. 4 is a reference point architecture block diagram 400 of a portion of the 5G core network 100 of FIG. 1, including a 4G CUPS virtual gateway function 479 according to an embodiment of the disclosure. The virtual gateway function 479 implements a user-plane gateway for use with Control and User Plane Separation of EPC nodes (4G CUPS). The virtual gateway function 479 may act as a User-plane PDN Gateway (PGW-U) or as a combined User-plane Serving Gateway (SGW-U) and PGW-U. Like the 5G translating virtual UPF 279 of FIG. 2, the virtual gateway function 479 is within the 5G core network 100, however all other elements of FIG. 4 are outside the 5G core network 100.

The virtual gateway function 479 receives 4G CUPS control plane messages via one or both of the Sxa and Sxb interfaces respectively from one or more 4G CUPS control-plane gateway elements, such as Control-plane Serving Gateway (SGW-C) 402 and Control-plane PDN Gateway (PGW-C) 404. The 4G CUPS control plane messages establish Sx sessions (4G CUPS user plane packet sessions) in the virtual gateway function 479 between an EPC RAN 456 (on communication link 406) and the PDN 140 via the SGi interface.

As described for the SMF of FIG. 2, a network may include 4G CUPS control-plane gateway elements made by different vendors having different versions and/or different implementations of the 4G CUPS standard. The 4G CUPS virtual gateway function 479 is configured to translate received 4G CUPS control plane messages into an internal, function-based model representation using received or pre-loaded translation methods.

In some embodiments, the virtual gateway function 479 operates as a PGW-U paired with an SGW-U in a split gateway. In such split gateway embodiments, the Sx sessions of the virtual gateway function 479 receive EPC RAN packets from the SGW-U on an S5u or S8u interface. In other embodiments, the virtual gateway function 479 operates as a combined PGW-U/SGW-U gateway. In such combined gateway embodiments, the Sx sessions may receive EPC RAN packets on an S12 interface from a Universal Mobile Telecommunications System (UMTS) RAN, on an S4U interface from a General Packet Radio Service (GPRS) RAN, or on an S1U interface from a Long Term Evolution (LTE) RAN. In either split gateway or combined gateway embodiments, the virtual gateway function 479 is configured to establish a plurality of Sx sessions to receive and send interspersed EPC RAN packets on one or more of the S12, S4U, S1U, S5u, and/or S8u interfaces.

Figure 5:
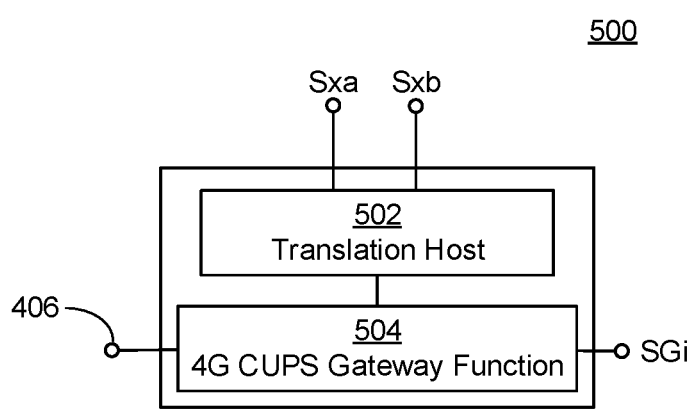
FIG. 5 is a block diagram of a 4G CUPS translating virtual gateway function according to an embodiment of the disclosure.

FIG. 5 is a block diagram of a 4G CUPS virtual gateway function 500 according to an embodiment of the disclosure. The virtual gateway function 500 is implemented on a network element and is suitable for use as the 4G CUPS translating virtual gateway function 479 of the 5G core network 100 shown in FIG. 4 in either a split gateway or combined gateway embodiment. The virtual gateway function 500 comprises a translation host 502 and a 4G CUPS gateway function 504. The translation host 502 communicates with one or more SGW-Cs 402 and/or PGW-Cs 404 via the Sxa and Sxb interfaces, respectively. During configuration of the 5G core network 100, the translation host 502 receives one or more configuration messages via the Sxa and/or Sxb interfaces including identifiers of the one or more SGW-Cs 402 and/or PGW-Cs 404 with which the translation host 502 will communicate and the individual IP addresses for each SGW-C 402 or PGW-C 404. As described for the 5G translating virtual network function 300 of FIG. 3, the 4G CUPS translating virtual gateway function 500 is a virtual function that appears to each SGW-C 402 or PGW-C 404 as a separate PGW-U or combined SGW-U and PGW-U on a unique IP address.

For individual SGW-Cs 402 and PGW-Cs 404, the configuration message may further include an identifier of a manufacturer of the SGW-C 402 or PGW-C 404 and the 4G CUPS release supported by the SGW-C 402 or PGW-C 404. In some embodiments, the configuration message further includes a translation method to be used by the translation host 502 to translate Sxa or Sxb messages received from the SGW-C 402 or PGW-C 404. In other embodiments, the identifier of the manufacturer of the SGW-C 402 or PGW-C 404 and the 4G CUPS release supported by the SGW-C 402 or PGW-C 404 identifies a translation method preloaded into the translation host 502. The translation host 502 may store received or preloaded translation methods in a library of translation methods, for later access.

When the translation host 502 receives an Sxa or Sxb message from the SGW-C 402 or PGW-C 404, the translation host 502 selects a translation method based on the IP address on which the Sxa or Sxb message was received and translates the Sxa or Sxb message into an internal, function-based Sxa/Sxb model representation of the message. The translation method used for an SGW-C 402 or PGW-C 404 accommodates any unique or different aspects of the implementation of Sxa or Sxb messages by the manufacturer of the SGW-C 402 or PGW-C 404 and translates the actual Sxa or Sxb message into the format of the model's uniform representation of the Sxa or Sxb message.

The translation host 502 then sends the model representation of the received Sxa or Sxb message to the 4G CUPS gateway function 504. The 4G CUPS gateway function 504 implements an Sx session based on the model representation of the received Sxa or Sxb message. Because the virtual gateway functions 479 and 500 appear as a plurality of virtual gateways to SGW-Cs 402 and/or PGW-Cs 404, the 4G CUPS gateway function 504 is configured to implement a plurality of Sx sessions, each based on the model representation of a different received Sxa or Sxb message.

As described for the UPF core interface function 304, the 4G CUPS gateway function 504 may comprise an FPGA, a GPU, or other processing accelerator, or it could be implemented as a user-level application on the translation host 502. Via the communication link 406, the 4G CUPS gateway function 504 sends and receives EPC RAN packets, as described above. Via the SGi interface, the 4G CUPS gateway function 504 sends and receives IP packets. Similarly to the UPF core interface function 304, the 4G CUPS gateway function 504 detects, processes, and forwards packets of an Sx session according to rules specified in the Sxa or Sxb message that established the Sx session.

Typically, packets are received via one of the communication link 406 and the SGi interface and are forwarded via the other interface. Because the 4G CUPS gateway function 504 implements a plurality of Sx sessions, packets of a first Sx session will be received intermixed with packets of a second Sx session, and similarly for the forwarding of packets.

Figure 6:
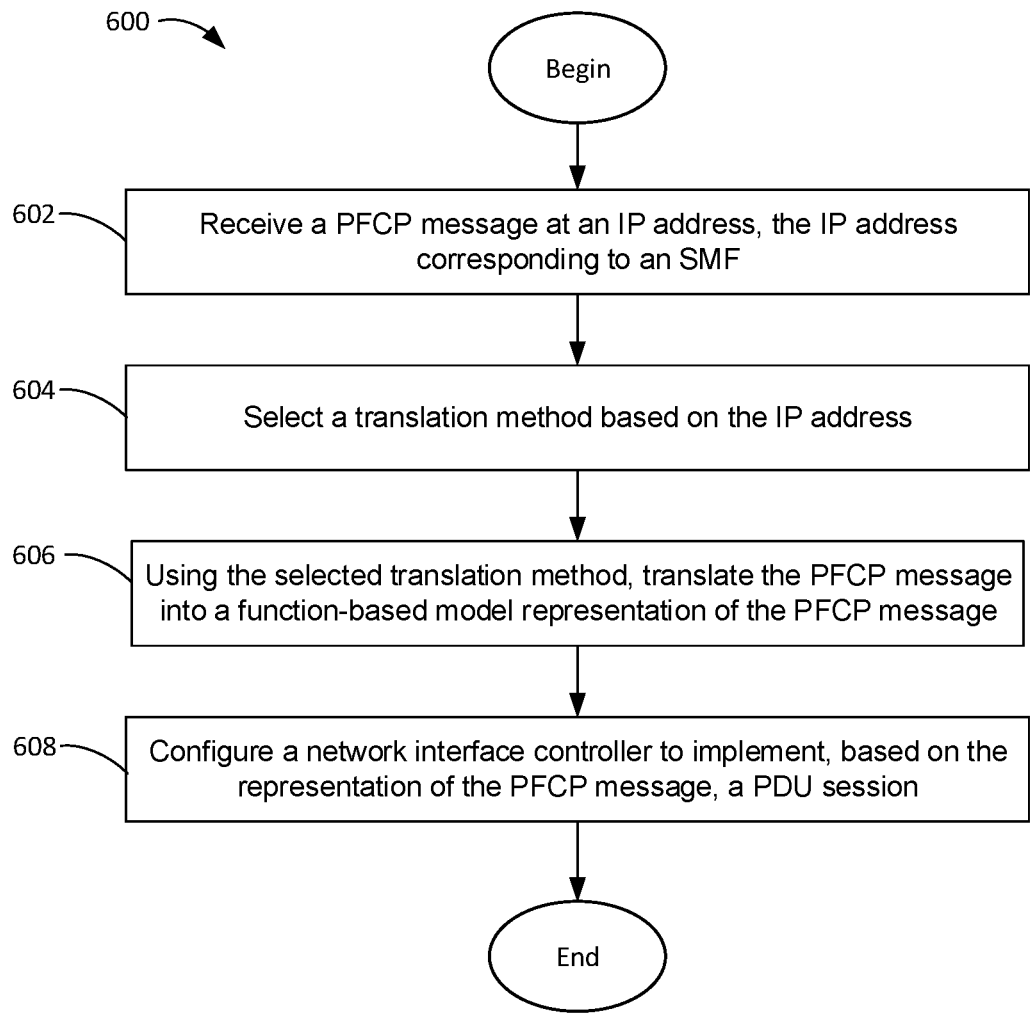
FIG. 6 is a flow chart of a method according to an embodiment of the disclosure.

FIG. 6 is a flow chart of a method 600 according to an embodiment of the disclosure. The method 600 is suitable for establishing, in response to a PFCP message, a PDU session in the 5G translating virtual UPF 279 according to the disclosure. In step 602, a network element implementing the UPF 279 receives a PFCP message at an IP address that corresponds to a SMF 177. The PFCP message is one of a plurality of PFCP messages received by the network element at one of a plurality of IP addresses of the network element. The network element provides a plurality of virtual UPFs, each virtual UPF communicating via a different one of the plurality of IP addresses.

The network element may receive a configuration message comprising an identifier of the SMF 177 and the IP address on which to receive one or more PFCP messages from the SMF 177. The network element may communicate with at least one SMF 177 as a plurality of virtual UPFs on a corresponding plurality of IP addresses. The identifier of the SMF 177 in the configuration message may include an identifier of a manufacturer of the SMF 177 and of the 3rd Generation Partnership Project (3GPP) release supported by the SMF 177, and may also include the translation method to be used to translate PFCP messages received from the identified SMF 177.

In step 604, based on the IP address on which the PFCP message was received, the network element selects a translation method to use to translate the received PFCP message. The network element may select the translation method from a stored library of translation methods. In step 606, the network element uses the selected translation method to translate the received PFCP message into a function-based model representation of the PFCP message.

In step 608, the network element configures a network interface controller to implement a PDU session that is based on the representation of the received PFCP message. The network interface controller may include one of a field-programmable gate array (FPGA), a graphics processing unit (GPU), or user-level application on the network element.

Figure 7:
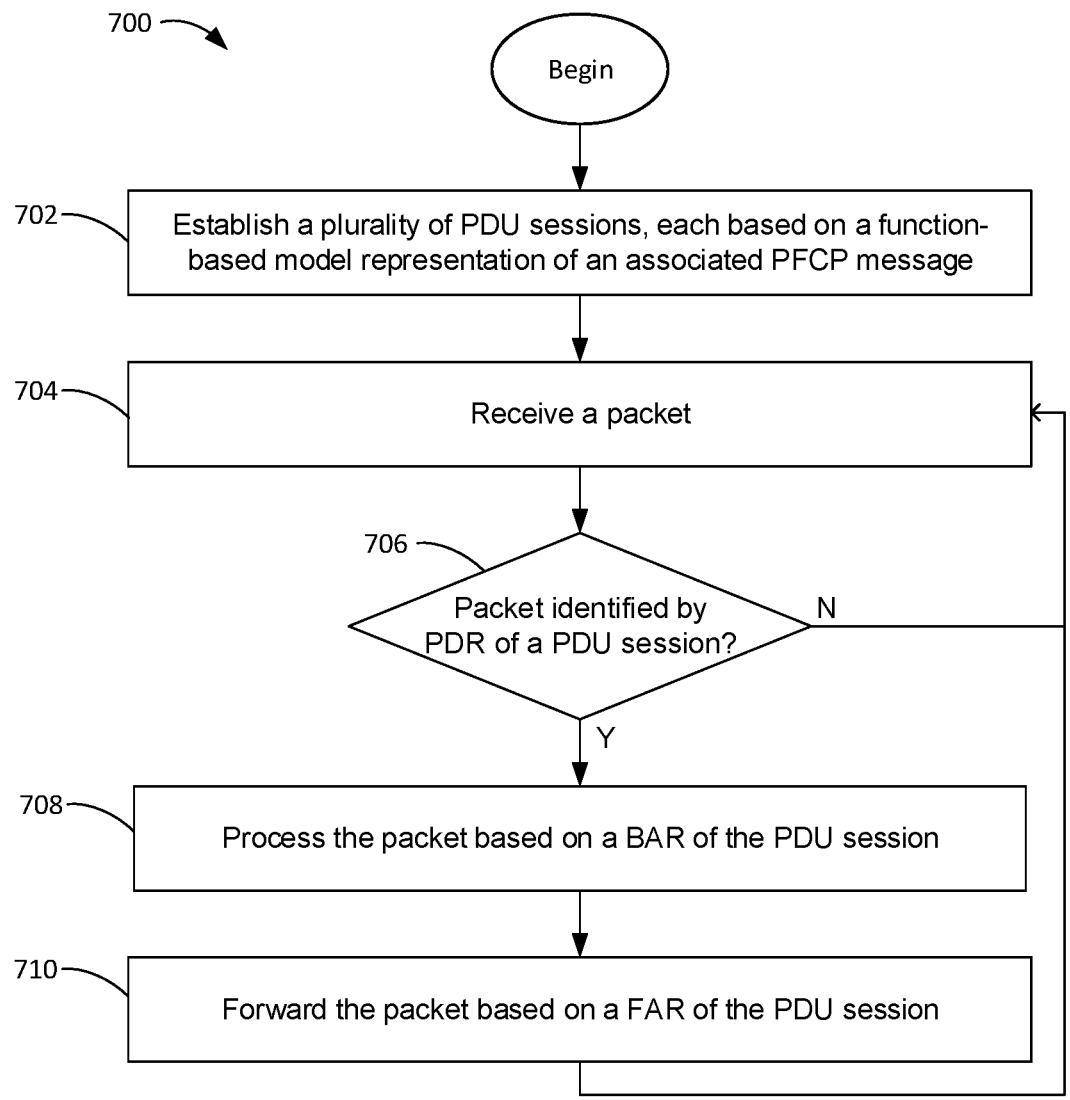
FIG. 7 is a flow chart of another method according to an embodiment of the disclosure.

FIG. 7 is a flow chart of another method 700 according to an embodiment of the disclosure. The method 700 is suitable for providing a plurality of protocol data unit (PDU) sessions in the 5G translating virtual UPF 279 according to the disclosure. In step 702, a network element implementing the UPF 279 establishes the plurality of PDU sessions, each PDU session based on a function-based model representation of an associated PFCP message received by the network element.

In step 704, the network element awaits receipt of a packet. Packets of a first PDU session may be received intermixed with packets of a second PDU session. When a packet is received, in step 706 the network element determines whether the packet is identified by a Packet Detection Rule (PDR) of one of the plurality of PDU sessions. If the packet is not identified by a PDR, the network element discards or otherwise disregards the packet and the method 700 goes to step 704 to await receipt of another packet.

If the packet is identified by a PDR in step 706, then in step 708 the network element processes the packet based on a Buffering Action Rule specified for the PDU session of the PDR that identified the packet. Rules of the PDU session may further cause the packet to be marked based on Quality of Service (QoS) Enforcement Rules and/or reported based on Usage Reporting Rules. In step 710, the network element forwards the processed packet based on a Forwarding Action Rule specified for the same PDU session. After forwarding the packet in step 710, the method 700 goes to step 704 to await receipt of another packet.

Step 702 may be performed by a translation host processor of the network element and translation of the PDU usage and event reporting message into a PFCP message that accommodates any unique or different aspects of the implementation of PFCP messages by the manufacturer of the SMF 177 may be performed by a translation host processor of the network element. Steps 704 through 710 may be performed by a network interface controller (or processor) of the network element. The network interface controller may include one of a field-programmable gate array (FPGA), a graphics processing unit (GPU), or user-level application on the network element.

Figure 8:
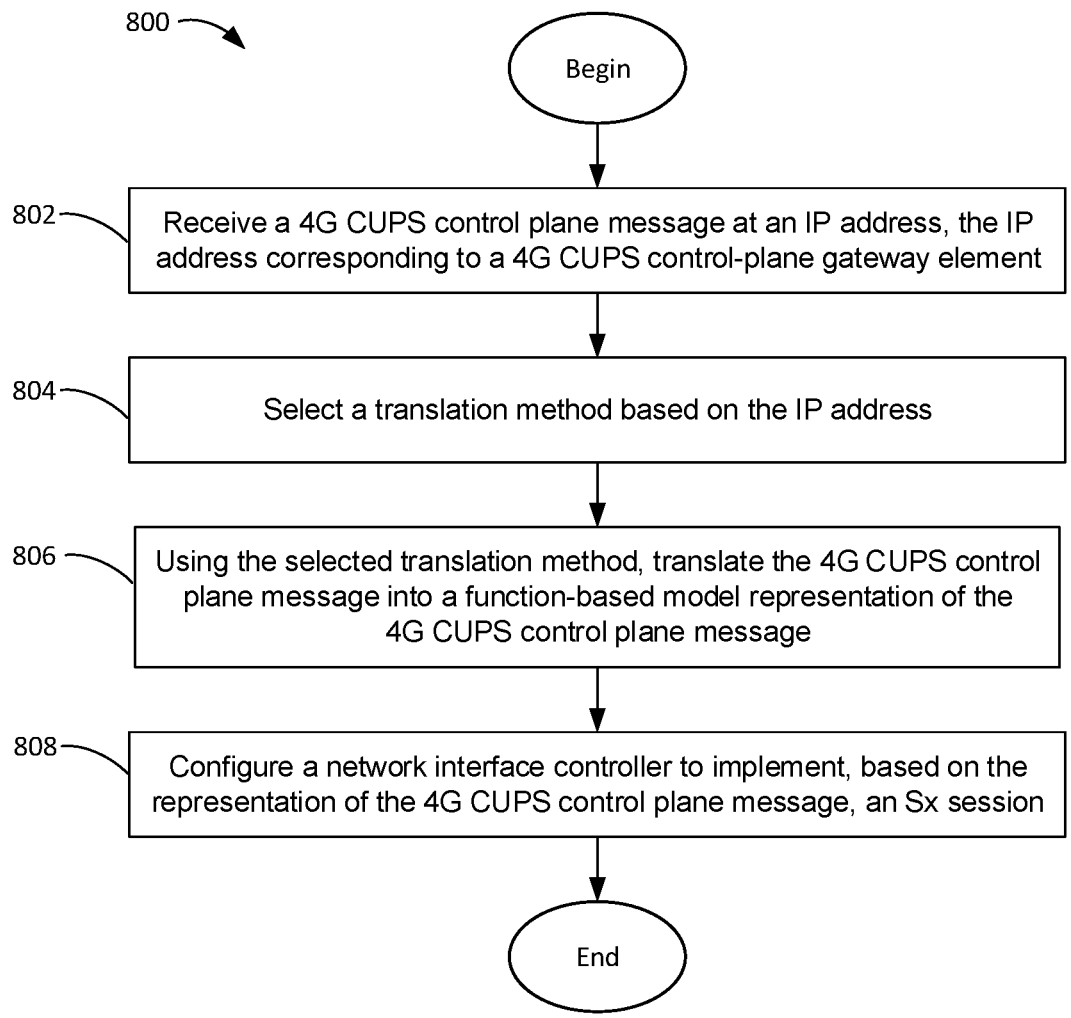
FIG. 8 is a flow chart of yet another method according to an embodiment of the disclosure.

FIG. 8 is a flow chart of yet another method 800 according to an embodiment of the disclosure. The method 800 is suitable for providing a 4G CUPS virtual gateway function 479 according to the disclosure. In step 802, a network element implementing the virtual gateway function 479 receives a 4G CUPS control plane message at an IP address that corresponds to a 4G CUPS control-plane gateway element, such as an SGW-C 402 or a PGW-C 404. The 4G CUPS control plane message is one of a plurality of 4G CUPS control plane messages received by the network element at one of a plurality of IP addresses of the network element. The network element provides a plurality of 4G CUPS virtual gateway functions, each virtual gateway function communicating via a different one of the plurality of IP addresses.

The network element may receive a configuration message comprising an identifier of the 4G CUPS control-plane gateway element and the IP address on which to receive one or more 4G CUPS control plane messages from the 4G CUPS control-plane gateway element. The network element may communicate with at least one 4G CUPS control-plane gateway element as a plurality of virtual UPFs on a corresponding plurality of IP addresses. The identifier of the 4G CUPS control-plane gateway element in the configuration message may include the translation method to be used to translate 4G CUPS control plane messages received from the identified 4G CUPS control-plane gateway element.

In step 804, based on the IP address on which the 4G CUPS control plane message was received, the network element selects a translation method to use to translate the received 4G CUPS control plane message. The network element may select the translation method from a stored library of translation methods. In step 806, the network element uses the selected translation method to translate the received 4G CUPS control plane message into a function-based model representation of the 4G CUPS control plane message.

In step 808, the network element configures a network interface controller to implement an Sx session that is based on the representation of the received 4G CUPS control plane message. The Sx session is configured to provide packet interface between an Evolved Packet Core (EPC) radio access network (RAN) and a packet data network (PDN).

The representation of the received 4G CUPS control plane message may identify the EPC RAN as one of a Universal Mobile Telecommunications System (UMTS) RAN, a Long-Term Evolution (LTE) RAN, and a General Packet Radio Service (GPRS) RAN. The packets received from the EPC RAN may be received from a serving gateway user (SGW-U) function.

Figure 9:
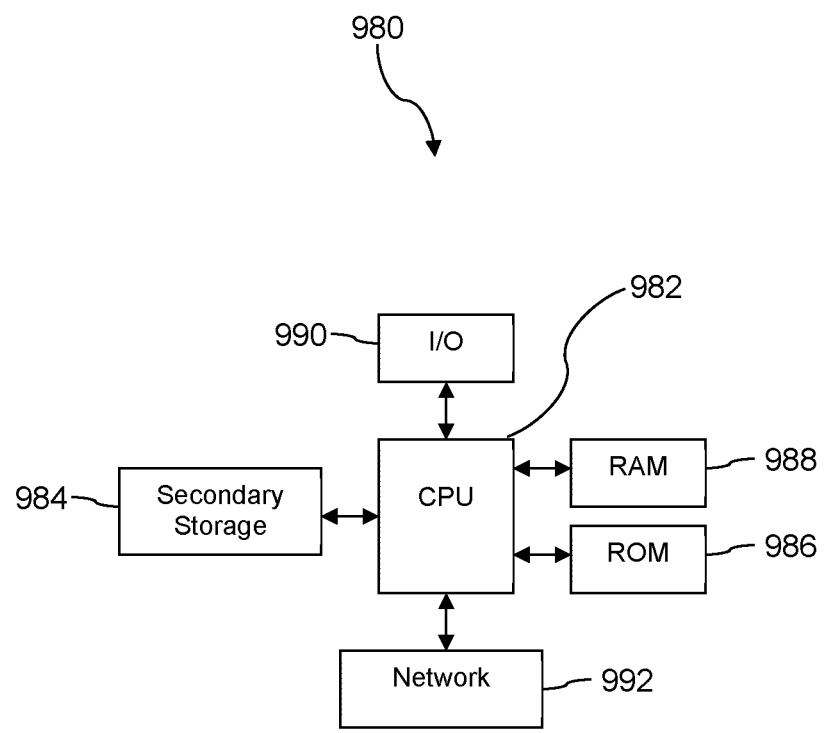
FIG. 9 illustrates a computer system suitable for implementing one or more embodiments disclosed herein.

FIG. 9 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 980 is turned on or booted, the CPU 982 may execute a computer program or application. For example, the CPU 982 may execute software or firmware stored in the ROM 986 or stored in the RAM 988. In some cases, on boot and/or when the application is initiated, the CPU 982 may copy the application or portions of the application from the secondary storage 984 to the RAM 988 or to memory space within the CPU 982 itself, and the CPU 982 may then execute instructions that the application is comprised of. In some cases, the CPU 982 may copy the application or portions of the application from memory accessed via the network connectivity devices 992 or via the I/O devices 990 to the RAM 988 or to memory space within the CPU 982, and the CPU 982 may then execute instructions that the application is comprised of. During execution, an application may load instructions into the CPU 982, for example load some of the instructions of the application into a cache of the CPU 982. In some contexts, an application that is executed may be said to configure the CPU 982 to do something, e.g., to configure the CPU 982 to perform the function or functions promoted by the subject application. When the CPU 982 is configured in this way by the application, the CPU 982 becomes a specific purpose computer or a specific purpose machine.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 992 may provide wired communication links and/or wireless communication links (e.g., a first network connectivity device 992 may provide a wired communication link and a second network connectivity device 992 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk-based systems may all be considered secondary storage 984), flash drive, ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer system 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for providing a plurality of protocol data unit (PDU) sessions by a network element, the method comprising:
    establishing by the network element each PDU session of the plurality of PDU sessions based on a function-based model representation of an associated Packet Forwarding Control Protocol (PFCP) message received by the network element;
    for each packet received by the network element, identifying by the network element the PDU session associated with the packet based on a Packet Detection Rule specified for the PDU session; and when the PDU session is identified for the packet:
        processing by the network element the packet based on a Buffering Action Rule specified for the PDU session; and
        forwarding by the network element the packet based on a Forwarding Action Rule specified for the PDU session.

2. The method of claim 1, wherein the plurality of PDU sessions are established by a first processor of the network element and each packet is identified, processed, and forwarded by a second processor of the network element.

3. The method of claim 2, wherein the second processor is one of a field-programmable gate array (FPGA) and a graphics processing unit (GPU).

4. The method of claim 1, further comprising discarding the packet when the PDU session is not identified for the packet.

5. The method of claim 1, wherein packets of a first PDU session are received intermixed with packets of a second PDU session.

6. A method for providing a 4G Control and User Plane Separation (4G CUPS) translating virtual network function by a network element, the method comprising:
    receiving by the network element a first 4G CUPS control plane message of a plurality of 4G CUPS control plane messages at a first Internet Protocol (IP) address of a plurality of IP addresses of the network element, the first IP address corresponding to a first 4G CUPS control-plane gateway element of one or more 4G CUPS control-plane gateway elements;
    selecting by the network element a translation method based on the first IP address on which the first 4G CUPS control plane message was received;
    translating by the network element the first 4G CUPS control plane message using the selected translation method into a function-based model representation of the first 4G CUPS control plane message; and
    configuring by the network element a network interface controller to implement, based on the representation of the first 4G CUPS control plane message, an Sx session for packet interface between an Evolved Packet Core (EPC) radio access network (RAN) and a packet data network (PDN).

7. The method of claim 6, wherein the network element provides a plurality of Sx sessions, each Sx session established in response to a 4G CUPS control plane message received via a different one of the plurality of IP addresses.

8. The method of claim 6, wherein the one or more 4G CUPS gateway elements include one or both of a serving gateway control (SGW-C) function and a packet data network gateway control (PGW-C) function.

9. The method of claim 6, wherein the representation of the first 4G CUPS control plane message identifies the EPC RAN as one of a Universal Mobile Telecommunications System (UMTS) RAN, a Long-Term Evolution (LTE) RAN, and a General Packet Radio Service (GPRS) RAN.

10. The method of claim 6, wherein packets received from the EPC RAN are received from a serving gateway user (SGW-U) function.

11. The method of claim 6, further comprising:
    receiving by the network element a configuration message comprising an identifier of a 4G CUPS gateway element and the IP address on which to receive one or more 4G CUPS control plane messages from the 4G CUPS gateway element.

12. The method of claim 11, wherein the configuration message further comprises the translation method used by the network element to translate 4G CUPS control plane messages received from the 4G CUPS gateway element.

13. A method for providing a translating virtual network function by a network element, the method comprising:
    receiving by the network element a first Packet Forwarding Control Protocol (PFCP) message of a plurality of PFCP messages at a first Internet Protocol (IP) address of a plurality of IP addresses of the network element, the first IP address corresponding to a first Session Management Function (SMF) of one or more SMFs;

selecting by the network element a translation method based on the first IP address on which the first PFCP message was received;

translating by the network element the first PFCP message using the selected translation method into a function-based model representation of the first PFCP message; and configuring by the network element a network interface controller to implement, based on the representation of the first PFCP message, a protocol data unit (PDU) session.

14. The method of claim 13, wherein the network element provides a plurality of virtual user plane functions (UPFs), each virtual UPF communicating via a different one of the plurality of IP addresses.

15. The method of claim 13, wherein the network interface controller comprises one of a field-programmable gate array (FPGA), a graphics processing unit (GPU), or user-level application on the network element.

16. The method of claim 13, further comprising:
receiving by the network element a configuration message comprising an identifier of an SMF and the IP address on which to receive one or more PFCP messages from the SMF.

17. The method of claim 16, wherein the network element communicates with at least one SMF on a subset of two or more of the plurality of IP addresses.

18. The method of claim 16, wherein the identifier of the SMF comprises an identifier of a manufacturer of the SMF and of a 3rd Generation Partnership Project (3GPP) release supported by the SMF.

19. The method of claim 16, wherein the configuration message further comprises the translation method used by the network element to translate PFCP messages received from the SMF.

20. The method of claim 19, wherein the network element stores the translation method in a library of translation methods.

* * * * *